United States Patent
Kasuya et al.

(10) Patent No.: US 8,333,002 B2
(45) Date of Patent: Dec. 18, 2012

(54) SURFACE FINISHING METHOD FOR STAINLESS STEEL MATERIAL AND MANUFACTURING METHOD FOR METAL GASKET

(75) Inventors: Tadashi Kasuya, Utsunomiya (JP); Shinichi Sato, Utsunomiya (JP); Mizuhiro Toki, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 1603 days.

(21) Appl. No.: 11/798,539

(22) Filed: May 15, 2007

(65) Prior Publication Data

US 2007/0266540 A1    Nov. 22, 2007

(51) Int. Cl.
 B23P 25/00 (2006.01)
 B05D 3/06 (2006.01)
 C23C 14/18 (2006.01)

(52) U.S. Cl. .......... 29/458; 427/528; 427/558; 427/444; 29/557

(58) Field of Classification Search .................. 29/458, 29/557; 427/528, 534, 558, 444; 134/1
See application file for complete search history.

(56) References Cited

U.S. PATENT DOCUMENTS

| | | | |
|---|---|---|---|
| 3,133,829 A * | 5/1964 | Cupery et al. | 427/379 |
| 3,757,413 A * | 9/1973 | Craik | 29/557 |
| 5,736,709 A * | 4/1998 | Neiheisel | 219/121.61 |
| 5,948,172 A * | 9/1999 | Neiheisel | 134/1 |
| 6,291,796 B1 * | 9/2001 | Lu et al. | 219/121.68 |
| 6,896,271 B2 * | 5/2005 | Uchida et al. | 277/593 |
| 7,097,177 B2 * | 8/2006 | Kasuya | 277/592 |
| 7,187,138 B2 * | 3/2007 | Kogure | 315/248 |
| 7,290,770 B2 * | 11/2007 | Kasuya | 277/592 |
| 7,588,252 B2 * | 9/2009 | Kasuya | 277/598 |
| 2006/0097657 A1 * | 5/2006 | Kogure | 315/248 |

FOREIGN PATENT DOCUMENTS

| | | | | |
|---|---|---|---|---|
| JP | 02197573 A | * | 8/1990 | |
| JP | 02197588 A | * | 8/1990 | |
| JP | 04235300 A | * | 8/1992 | |
| JP | 05007829 A | * | 1/1993 | |
| JP | 06017269 A | * | 1/1994 | |
| JP | 2001332482 A | * | 11/2001 | |

* cited by examiner

*Primary Examiner* — Essama Omgba

(74) *Attorney, Agent, or Firm* — Manabu Kanesaka

(57) ABSTRACT

In a surface finishing method for a stainless steel material, excimer irradiation is made on a surface of the stainless steel material by emitting ultraviolet light to improve wetness. Then, a surface finishing is applied on the surface of the stainless steel material wherein the wetness is improved. In manufacturing a gasket, the stainless steel material or plate is cut in a predetermined shape, and holes and bead are formed in the metal formation plate. Then, the plate may be assembled with other plate.

8 Claims, 1 Drawing Sheet

SURFACE FINISHING METHOD FOR STAINLESS STEEL MATERIAL AND MANUFACTURING METHOD FOR METAL GASKET

BACKGROUND OF THE INVENTION AND RELATED ART STATEMENT

The present invention relates to a surface finishing or processing method for a stainless steel material, and a manufacturing method for a metal gasket, such as a gasket, for an exhaust manifold for an engine, or a cylinder head gasket and the like.

When a joint surface between an exhaust manifold and an exhaust pipe for an automobile engine, or a joint surface between a cylinder head and a cylinder block (cylinder body) is sealed, a metal gasket is clamped between members to seal combustion gas, coolant water, and lubrication oil.

Such a metal gasket is generally manufactured by the following method. At first, after a metal plate made by soft steel, annealed stainless (annealed material), or stainless steel material (spring steel) is cleaned and a general surface finishing such as a chromate filming is applied, a primer is applied to the metal plate. And then, the metal plate is formed in the shape of a metal gasket by punching with a press die corresponding to each metal gasket, i.e. cutting to the gasket shape. This metal formation plate is pressed, and a seal bore is opened, or a depression and a projection such as a folding back portion (grommet), a full bead, or a half bead, are formed. Next, when a middle plate is used, rubber or resin is applied to the middle plate according to necessity. When the metal formation plates are ready, these metal formation plates are assembled to form a metal gasket. The front and the back surfaces of this assembled metal gasket are coated with rubber or resin. After the coating is completed, the metal gasket is inspected. After the approval of the inspection, the metal gasket is shipped as a product.

However, in the conventional art, the surface of the metal plate including the metal gasket is finished after being cleaned by organic solvent, alkali, acid, or water type cleaner. Accordingly, liquid waste disposal, or a technology or equipment for preventing the release of volatile organic compounds (VOC) contained in the organic solvent into environment, is required. The volatile organic compounds are considered as one of causative agents of photochemical oxidant and suspended particulate matter, and reducing volatile organic compounds has been strongly required from the standpoint of environmental conservation.

On the other hand, a water type paint in which the organic solvent in the paint is replaced by water has been developed and used for the surface of various types of metal plates. Regarding the application of the water type paint, the following coating method of a molding material, such as shown in Japanese Patent Publications No. 11-156274, is proposed. The coating method of the molding material comprises a cleaning process wherein the surface of the molding material is cleaned by spraying water into the surface; a water removal process wherein water attached on the surface of the molding material is removed; a paint application process wherein water type paint containing alcohol is applied to the molding material; and a high-speed hot air type drying process wherein hot air is sprayed at high speed on the surface of the molding material on which the paint is applied.

However, in the cleaning process of the coating method, in order to remove molding oil, metal ion, dust and the like, high-pressure hot water cleaning equipment which sprays hot water at 60° C.~70° C. from a hot water spray ring with a pressure at approximately 5~7 kg/cm$^2$, is used. Accordingly, the high-pressure hot water cleaning equipment must be large.

Also, when the surface of the stainless steel material is processed by a water type surface finishing which applies a water type surface finishing agent, such as a trivalent chromium, silica, and zirconia type, in order to improve adhesiveness of the primer, wetness 73 in the "Wetting Tension Test Method" of "JIS K 6768:1999" is required. In comparing with the wetness approximately 52 when a solvent type primer is applied without the water type surface finishing, specific wetness is required. The value of the wetness 73 relative to the water type surface finishing cannot be easily obtained. Enough wetness cannot be obtained by dry cleaning with a low-pressure mercury vapor lamp, or even if enough wetness can be obtained, a long processing time is required.

The metal gasket such as the cylinder head gasket has been used in a severe condition with an improvement of an engine, and also peeling of the paint, such as rubber or resin, has become a big problem. Therefore, the improvement of the adhesiveness of the primer has become an important issue, since the improvement of the adhesiveness of the primer' has a large effect on the prevention of the peeling of the paint which is going to be coated on the top of the primer.

The present invention has been made in order to solve the problem described above, and the object of the invention is to provide a surface finishing or processing method for the stainless steel material, and a manufacturing method for the metal gasket, which uses a relatively small equipment; does not require cleaning with an organic solvent, alkali, acid, or water type cleaner; and can make a great contribution to environmental conservation by not creating waste fluid and its disposal and by preventing the release of the volatile organic compounds.

Further objects and advantages of the invention will be apparent from the following description of the invention.

SUMMARY OF THE INVENTION

In order to attain the object described above, according to the present invention, a surface finishing or processing method for a stainless steel material improves wetness by excimer irradiation on the surface of the stainless steel material by an xenon lamp which emits ultraviolet light at a wavelength of 172 nm, and finishes the surface wherein the wetness is improved. Moreover, in the surface finishing method for the stainless steel material, the surface is finished by a water type surface finishing.

Also, a manufacturing method for a metal gasket according to the present invention in order to achieve the above-mentioned object, comprises: a cleaning process which cleans the surface of the metal formation plate of the metal gasket; a surface finishing process which finishes the surface of the metal formation plate; a cutting process which cuts the metal formation plate in a predetermined shape; a pressing process which opens a hole in the metal formation plate and forms a bead; and an assembly process which assembles the metal formation plate. In the cleaning process, when the metal formation plate is made of stainless steel material, the metal formation plate is dry-cleaned by the excimer irradiation. Moreover, in the manufacturing method for the metal gasket, the surface is finished by a water type surface finishing in the surface finishing process.

The "surface finishing" in this invention includes the surface finishing, such as a chromate finishing which is generally used, or the following water type surface finishing. The surface finishing adheres metal with the primer coating and the paint such as rubber or resin. Also, the "water type surface finishing" in this invention means that the metal surface is finished by applying a water type surface finishing agent, such as a trivalent chromium, silica, and zirconia type by a roll coater or dipping. With the water type surface finishing, adhesiveness of the primer or the paint which is applied on the finishing face can be improved.

After the surface of a stainless steel plate is finished by a general surface finishing or the water type surface finishing after excimer irradiation finishing, solvent type paint such as rubber or resin such as solvent type primer, fluorine, and NBR, is applied. Or, after the water type surface finishing is conducted after the excimer irradiation finishing, the solvent type primer and the solvent type paint are applied. Or the water type surface finishing is conducted after the excimer irradiation finishing, and then, the water type primer and the water type paint are applied. Or, the water type surface finishing is conducted after the excimer irradiation finishing, and then, the water type paint is directly applied. The stainless steel plate after the above-mentioned finishing becomes the most appropriate material as the metal formation plate of the metal gasket.

In this invention, the metal surface can be dry-cleaned at a short time by conducting the excimer irradiation, and when the metal surface is cleaned, organic solvent, alkali, acid, or water type cleaner is not used, so that the generation of washing wastewater and handling industrial waste of the washing wastewater can be prevented. Also, volatile organic compounds (VOC) contained in organic solvent and considered as one of the causative agents of photochemical oxidant and suspended particulate matter, can be prevented.

Especially, in the invention, since wetness more than 73 which is necessary for the water type surface finishing can be assured by conducting the excimer irradiation, a sufficient cleaning effect can be obtained relative to the water type surface finishing by the water type surface finishing agent. Therefore, the water type surface finishing can be easily conducted. Even if the water type paint such as rubber or resin is directly applied to the metal surface after the water type surface finishing, high adhesiveness can be assured. Incidentally, the wetness 73 is determined by the "Wetting Tension Test Method" of the "JIS K 6768:1999".

In the surface finishing method for the stainless steel material and the manufacturing method for the metal gasket, the stainless steel material differs from soft steel, and it is hard to assure necessary wetness especially when the water type surface finishing is conducted, so that the excimer irradiation provides especially a large effect.

According to the surface finishing method for the stainless steel material and the manufacturing method for the metal gasket of the invention, due to the excimer irradiation, the cleaning does not require to use a solvent type finishing agent or a cleaning agent, so that the invention can prevent the development of the volatile organic compounds contained in the solvent without generating industrial waste, such as the solvent type finishing agent or the cleaning agent. As a result, the invention can greatly contributes to environmental conservation.

In addition, due to the combination of the excimer irradiation and the water type surface finishing, the adhesiveness between the metal surface and the primer can be improved only by applying the water type surface finishing agent on a metal surface which was dry-cleaned by the excimer irradiation, and drying.

DETAILED DESCRIPTION OF PREFERRED EMBODIMENTS

Hereunder, a surface finishing or processing method for a stainless steel material and a manufacturing method for a metal gasket according to an embodiment of the present invention will be explained with reference to the attached drawings.

Incidentally, the following "surface finishing" includes surface finishing, such as a chromate finishing which is generally used, or the following water type surface finishing. Here, a primer coating, and a rubber or resin coating are excluded. Also, the following "water type surface finishing" means finishing of a metal surface by applying a water type surface finishing agent, such as a trivalent chromium, silica, and zirconia type by a roll coater or dipping. Also, a "water type" means a type in which organic solvent is replaced by water relative to a "solvent type" in which an organic solvent is used. Also, wetness is defined by the "Wetting Tension Test Method" of the "JIS K 6768:1999"

Figure 1:
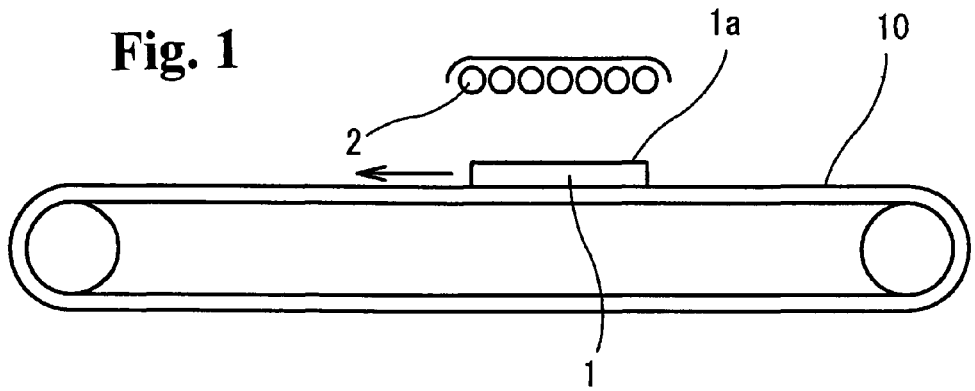
FIG. 1 is a schematic view showing a condition of excimer irradiation.

As shown in FIG. 1, in the surface finishing method for the stainless steel material according to the embodiment of the present invention, surface 1a of a stainless steel material 1 which is conveyed by a belt conveyer 10 is dry-cleaned by excimer irradiation by a xenon lamp 2 which irradiates ultraviolet light at a wavelength of 172 nm, so that wetness is improved.

The excimer irradiation means irradiation of short-wavelength ultraviolet (VUV), and xenon ($Xe_2$) or argon ($Ar_2$) can be used as a type of discharge gas. However, it is preferred to use excimer irradiation at the wavelength of 172 nm using xenon. Excimer irradiation emits a quasi-monochromatic light, so that energy conversion efficiency is excellent. In the dry cleaning or reforming, an unnecessary visible light or infrared light is relatively little, so that heat damage can be prevented. Therefore, the dry cleaning can be conducted at low heat.

Excimer irradiation provides a larger photon energy as compared to a mercury lamp (wavelengths of 185 nm and 254 nm), so that photon energy which is higher than the molecular binding energy of an organic material required for organic removal and can break the organic bond, can be obtained. Also, due to the large photon energy, activated oxygen which is essential for volatilizing and removing the organic material, can also be obtained in sufficient quantities.

When excimer irradiation which is an irradiation of short-wavelength ultraviolet with a high energy level is applied on a work surface, a large portion of main chains or side chains of a material on a surface is broken due to the short-wavelength energy, and hydrogen atom contained in the material is separated from the surface. The hydrogen atom binds with active oxygen which is generated by ultraviolet radiation from oxygen in the atmosphere, and forms acyl group (COH) , hydroxyl group (OH) , carboxyl group (COON) on the surface. Accordingly, the coating material, such as an adhesive or paint which was difficult to adhere, is also improved with adhesiveness, since the coating material has an excellent chemical binding efficiency with the above-mentioned medium groups. At the same time, the oil content oozed from the organic material which remains on the surface of various types of materials, or from the material itself, can be oxidized and cleaned by the VUV energy and the active oxygen.

The surface 1a wherein the wetness is improved by the excimer irradiation is finished by a general surface finishing, such as chromate finishing, or water type surface finishing. After the general surface finishing is conducted, or after the water type surface finishing wherein the water type surface finishing agent is applied by a roll coater process or a dipping process is conducted, solvent type primer improving the adhesiveness of the adhesive or the paint according to need, is applied. Epoxy resin may be used as the primer. In addition, paint of rubber or resin, such as fluorine, NBR and the like, is applied, and the surface treatment and coating on the stainless steel material are completed.

When the water type surface finishing is conducted, an adhesive-enhancing effect between the metal surface and the primer can be obtained only by applying a water type surface finishing agent, such as trivalent chromium, silica, and zirconia and drying in addition to the dry cleaning by the excimer irradiation. Therefore, the water type surface finishing is applied after the excimer irradiation process, and then, the solvent type primer and the solvent type paint may be applied. Also, the water type surface finishing is applied after the excimer irradiation finishing, and then, the water type primer and a water type paint may be applied. Also, even if the water type paint is directly applied without the primer coating, because the wetness is significantly improved, high adhesiveness can be obtained. When the water type primer or the water type paint is used, the volatile organic compounds contained in the solvent is not used as compared to the solvent type primer or the solvent type paint, thereby making a great contribution to environmental conservation.

Figure 2:
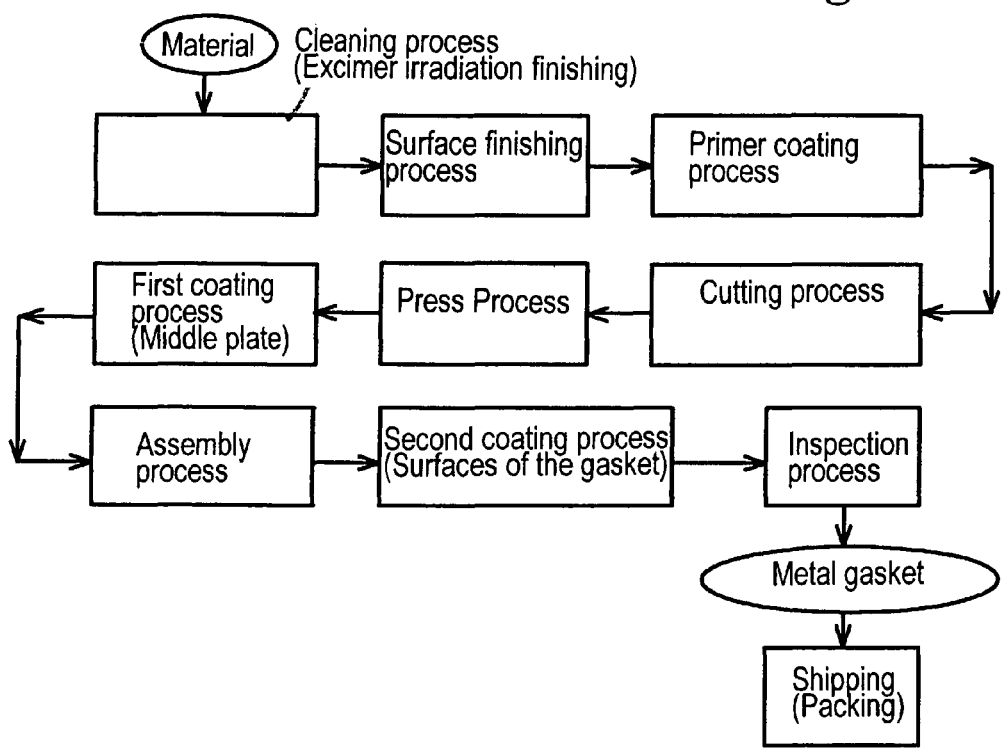
FIG. 2 is a view showing the manufacturing process of a metal gasket according to an embodiment of the invention.

As shown in FIG. 2, the manufacturing method for the metal gasket according to the embodiment of the invention comprises a cleaning process which cleans the surface of the metal material; a surface finishing process which conducts the surface finishing on a metal formation plate; a primer coating process; a cutting process which cuts the metal formation plate in the shape of the gasket; a press process which opens a hole on the metal formation plate and forms a folded portion or a bead; a first coating process which coats a material on a middle plate; an assembly process which assembles the metal formation plates; a second coating process which coats a material on the metal gasket constituted by assembling the metal formation plates; and an inspection process which inspects the metal gasket.

In the cleaning process, the metal formation plate receives the excimer irradiation, and the metal surface is dry-cleaned, so that wetness is improved. During the cleaning process, the excimer irradiation is conducted when the plate is made of a stainless steel plate which is required to refinish the surface. When the surface of the plate has been already finished as in the case of soft steel, the surface is not refinished. With the surface finishing process, a general surface finishing or water type surface finishing is conducted, and with the primer coating process, the solvent type primer or the water type primer is applied and dried.

In the next cutting process, the metal plate formed by soft steel, annealed stainless (annealed material), or stainless steel material (spring steel) is punched out with a press die corresponding to each metal gasket, thereby forming a shape for the metal formation plate of the metal gasket.

In the next press process, in the case of the cylinder head gasket, a cylinder bore (combustion chamber hole), water hole, oil hole, bolt hole and the like is opened by the press process. The bead and the folded portion (grommet) are also formed by the press process at the same time. Also, in the case of the metal gasket including the middle plate, the middle plate of the metal formation plate is coated by a solvent type paint such as rubber or resin, or a water type paint, as the first coating.

In the next assembly process, each metal formation plate is laminated in a predetermined order, assembled, and unified. In the invention, in the next second coating process, a solvent type paint such as rubber or resin, or the water type paint is applied on the surfaces of the metal formation plates at the front and backside of the assembled metal gasket. In the next inspection process, the metal gasket completed by the application of the paint is inspected, and rejected items are eliminated, thereby completing the manufacturing process. The metal gasket which has passed the inspection is packed and shipped as a product.

In the invention, the excimer irradiation finishing is conducted on the middle plate or the surface of the metal formation plate which becomes the surface of the metal gasket after assembly, so that the metal surface can be dry-cleaned at a short time. When the metal surface is cleaned, a solvent type cleaner, alkali, acid, or water type cleaner is not used, so that industrial waste of effluent of the above-mentioned cleaners is not formed. Also, since the generation of volatile organic compounds contained in the organic solvent can be prevented, the invention can make a great contribution to environmental conservation. As a result, an environment-friendly metal gasket can be provided.

Moreover, the material with the excimer irradiation finishing has enough wetness relative to water, so that adhesiveness of the primer or the paint to be coated is improved. Therefore, the stainless steel plate with excimer irradiation finishing becomes the most appropriate material for the metal gasket, so that an excellent metal gasket can be obtained.

Also, in the case of the water type surface finishing, a sufficient cleaning effect can be obtained relative to the water type surface finishing by the water type surface finishing agent by conducting excimer irradiation. Since wetness more than 73 which is necessary for the water type surface finishing can be assured, the water type surface finishing can be easily made. By the combination of the excimer irradiation and the water type surface finishing, the adhesiveness between the metal surface and the primer can be improved. In addition, when the water type primer or the water type paint is used for the primer or the paint, the reduction of the volatile organic compounds can be made even more.

Incidentally, the cylinder head gasket is explained as an example. However, this invention is not limited to the cylinder head gasket, and can also be applied to an engine-related metal gasket such as a gasket for an intake manifold or a gasket for an exhaust manifold, or also metal gaskets other than the engine-related metal gasket.

The disclosure of Japanese Patent Application No. 2006-140144, filed on May 19, 2006, is incorporated in the application.

While the invention has been explained with reference to the specific embodiments of the invention, the explanation is illustrative and the invention is limited only by the appended claims.

What is claimed is:

1. A surface finishing method for a stainless steel material, comprising:
    applying a wetness improving 172 nm ultraviolet wavelength excimer irradiation on a surface of the stainless steel material to break main chain or side chain of a material on the surface and separate hydrogen atom contained in the material from the surface, and
    providing a surface finishing on the wetness improved surface of the stainless steel material, wherein the hydrogen atom contained in the material binds with active oxygen and forms a material including acyl group to assist binding of the coating material with the metal.

2. A surface finishing method according to claim 1, wherein said excimer irradiation is produced by using a xenon lamp.

3. A surface finishing method according to claim 1, wherein the surface finishing is a water surface finishing.

4. A surface finishing method according to claim 3, wherein the water surface finishing comprises applying a water based surface finishing agent selected from at least one of trivalent chromium, silica, and zirconia, by roll coater or by dipping.

5. A manufacturing method for a metal gasket, comprising:
a cleaning process which dry-cleans a surface of a stainless steel plate of the metal gasket by using a wetness improving 172 nm wavelength excimer irradiation to break main chain or side chain of a material on the surface and separate hydrogen atom contained in the material from the surface,
a surface finishing process which finishes the surface of the stainless steel plate,
a cutting process which cuts the stainless steel plate into a predetermined shape,
a press process which opens holes in the stainless steel plate and forms a bead, and
an assembly process which assembles the stainless steel plate into the metal gasket,
wherein the hydrogen atom contained in the material binds with active oxygen and forms a material including acyl group to assist binding of the coating material with the metal.

6. A manufacturing method according to claim 5, wherein said excimer irradiation is produced by using a xenon lamp.

7. A manufacturing method according to claim 6, wherein the surface finishing is a water surface finishing in the surface finishing process.

8. A manufacturing method according to claim 7, wherein the water surface finishing comprises applying a water based surface finishing agent selected from at least one of trivalent chromium, silica, and zirconia, by roll coater or by dipping.

* * * * *